United States Patent [19]

Negishi

[11] 4,222,239
[45] Sep. 16, 1980

[54] HEAT ENGINE

[76] Inventor: Masataka Negishi, 1000, Oaza-Ryoke, Urawa-shi, Saitama-ken, Japan

[21] Appl. No.: 837,921

[22] Filed: Sep. 29, 1977

[30] Foreign Application Priority Data

Sep. 30, 1976 [JP] Japan .................. 51-116596

[51] Int. Cl.³ .............................. F03G 7/06
[52] U.S. Cl. ...................... 60/527; 60/520; 60/325
[58] Field of Search ............. 60/516, 517, 518, 520, 60/526–528, 523, 530–531, 325

[56] References Cited

U.S. PATENT DOCUMENTS

| | | |
|---|---|---|
| 2,255,943 | 9/1941 | Sarver ........................... 60/530 |
| 3,713,288 | 1/1973 | Van Andel ..................... 60/516 |
| 3,782,121 | 1/1974 | Marcoux et al. ............... 60/527 |
| 3,968,692 | 7/1976 | Blättler et al. ................ 60/527 X |

Primary Examiner—Allen M. Ostrager
Assistant Examiner—Stephen F. Husar
Attorney, Agent, or Firm—Haseltine, Lake & Waters

[57] ABSTRACT

A heat engine using as the working medium a non-compressible substance such as a liquid or a solid. The non-compressible substance in an enclosure is moved alternately relative to and between a high temperature zone and a low temperature zone to undergo expansion and contraction, which are transmitted directly or indirectly as mechanical displacement by an output piston. As the non-compressible substance, polyethylene or paraffin is most desirable.

16 Claims, 19 Drawing Figures

HEAT ENGINE

BACKGROUND OF THE INVENTION

This invention relates to heat engines which are operated by the utilization of variations in volume of materials which are expanded and contracted when heated and cooled, and more particularly to a heat engine utilizing a non-compressible material.

Known as heat engines in the art are steam engines, external combustion engines, and internal combustion engines. Among them, the steam engines are bulky because they need a boiler, a condenser, etc. The external combustion engines are less developed because of technical difficulty. Thus, the internal combustion engines are most extensively employed. However, recently it has been pointed out that the internal combustion engines are sources of public nuisance generating air pollution, noise, and so forth. In order to overcome this drawback, a variety of methods to improve internal combustion engines have been proposed; however, these methods are still insufficient to completely eliminate the drawback. Since most of the internal combustion engines use fossil fuels, especially petroleum, the use of the internal combustion engines is liable to be affected by changes in fuel supply which have been caused recently. Accordingly, there is a strong demand for the development of novel heat engines which can replace the internal heat engines.

Thus, the Stirling cycle engine has been reconsidered in the course of developing these novel engines. This is an external combustion type gas engine which has been put into practical use hitherto and has the possibility of being practically used in some cases.

However, this engine needs considerably high technology in material and mechanical construction, and still has problems to be solved in combining it with load devices.

An ideal engine can satisfy a variety of requirements such as compactness, high efficiency, great output, and high durability. In order to provide such an ideal engine, it is necessary:

(1) to increase the engine rotational speed;
(2) to increase the pressure of a fluid sealed therein;
(3) to increase the compression ratio;
(4) to increase the temperature on the high temperature side; and
(5) to increase the efficiencies in heat exchange of the heater, the reheater, and the cooler.

However, these requirements involve the following problems.

In order to increase the rotational speed, it is necessary to increase the speed of movement of the gas. However, the heater, the reheater, and the cooler impose obstructions in the gas passage. Therefore, if the rotational speed is increased, the flow resistance is greatly increased, and the engine power is decreased. If, in order to overcome this difficulty, a gas, such as hydrogen or helium, which is of lower density than air is used, the problem of sealing arises in addition to the problem of increasing the pressure of the fluid sealed. Especially, sealing hydrogen gas is very difficult because it can pass through metal, and the problem of hydrogen embrittlement arises. The increase of the compression ratio may be achieved by making as small as possible the volume of the operating fluid when it is most compressed. However, in order to do so, it is necessary to decrease the internal volumes of the heater, the reheater, and the cooler and to decrease the internal volume of passages connecting these elements, which will lead to insufficient heat exchange. This is a problem to be solved prior to solving the problem of increasing the heat exchange efficiency. The increase of the temperature on the high temperature side is limited by the material to be used to approximately 800° C. However, it is difficult to design the engine with small size and increased heat exchange rate, in the case where it is continually subjected to such a high temperature. In addition, the temperature increase will raise the problem of lubrication oil treatment; that is, a problem arises in the lubrication system.

SUMMARY OF THE INVENTION

Accordingly, an object of this invention is to eliminate all of the above-described difficulties accompanying heat engines. More specifically, the main object of the invention is to provide a novel heat engine which has a simple construction and a high performance.

Another object of this invention is to provide a heat engine which operates at relatively low temperature with little noise.

In order to achieve the foregoing objects, the present invention provides a novel heat engine in which a non-compressive thermal operating substance which is expanded and contracted by temperature change is employed in such a manner that variations in volume of the thermal operating substance is converted into the output of the engine.

According to this invention, briefly summarized, there is provided a heat engine comprising means retaining a non-compressible thermal opening substance which changes in volume in accordance with temperature change, means forming a low temperature zone, means forming a high temperature zone greater in temperature than said low temperature zone, means for subjecting said thermal operating substance alternately to said high and low temperature zone to cause alternate volumetric expansion and contraction of the thermal operating substance, and power output means for converting the volumetric expansion and contraction into a mechanical displacement.

The features which are believed to be novel and characteristic of this invention are set forth in the appended claims. The invention itself, however, together with the further objects and advantages thereof, will be best understood from the following detailed description of preferred embodiments of the invention with reference to the accompanying drawings, in which like reference characters denote the same parts and elements.

DETAILED DESCRIPTION

As conducive to a full understanding of the principle of this invention, some explanation of a thermal operating substance, which plays an important role in the invention, will first be presented.

The thermal operating substance may be any non-compressible material whose volume is changed according to temperature change; however, it is preferable that it be a non-compressible material having a high coefficient of cubic expansion. Such a material is a liquid or a solid. The most suitable material is a synthetic resin such as polyethylene. Paraffins are also suitable as the thermal operating substance. Mercury or alcohols can also be employed. It should be noted that a mixture of any of said material with other materials can also be used. With respect to the coefficient of cubic expansion, the coefficient of volumetric change in the vicinity of a transformation point is also considered. The volumetric change of the thermal operating substance due to heating or cooling thereof can be taken out with the aid of a material such as water or oil whose volume cannot be easily changed.

Now, with respect to the aforementioned requirements (1) through (5), the thermal operating substance will be considered in comparison with a gas.

The increase of the rotational speed results in an increase in the displacement and a decrease in the time period of the displacement. Since a gas is compressible, it is contracted when it imparts force to the load. In addition, the gas used in a gas engine undergoes only an abrupt expansion, or an explosion, for a short period in two strokes or four strokes of each piston of the engine, and accordingly the gas engine is provided with a flywheel or inertia wheel to utilize this explosion uniformly over the period of the two or four strokes. In this connection, the increase of the rotational speed has a significant meaning. The engine is further provided with a speed change gear mechanism so as to maintain the engine speed within a certain speed range.

On the other hand, being non-compressible, the liquid or solid can supply force to the load throughout its entire process of volumetric change and can impart a great force to the load even when the volumetric change thereof is converted into a large amount of displacement. Accordingly, the increase in the displacement and the decrease in the time period thereof can be promoted by these two features, and a sufficient amount of work can be obtained even with a small displacement and a long time period.

The increase in pressure of the fluid will give rise to the problem of sealing the fluid. However, as the thermal operating substance and its associated fluid medium are liquids or solids, they can be readily sealed, and therefore a high pressure can be readily obtained.

Increasing the compression ratio may be disregarded in the case of a liquid or solid, unlike the case of a gas, because liquids and solids are non-compressible. Accordingly, the difficulties accompanying the provision of a heat exchanger such as a reheater in a gas engine can be disregarded. In addition, as the compression ratio can be disregarded, it is unnecessary to provide an auxiliary power source for use during the starting period of the engine.

The increase of the temperature of the high temperature side is one of the fundamental conditions for increasing the thermal efficiency. Accordingly, this should be taken into consideration in connection with the aforementioned synthetic resin, materials of paraffin series or substitutes thereof; that is, it is necessary to make a temperature region where the volumetric change is a maximum, as high as possible. This temperature region is often the softening point of a non-crystalline material.

The thermal operating substance should have the following properties. It should undergo a great volumetric change at high temperature (in this case, the temperature in the operating range should be a middle temperature between the temperature on the high temperature side and the temperature on the low temperature side), and in addition it has a low specific heat and a high heat conductivity.

With respect to the heat exchange, it is unnecessary to provide a heat exchanger such as a reheater for the thermal operating substance; that is, the high temperature side and the low temperature side can be maintained at respective predetermined temperatures.

Figures 1, 2:
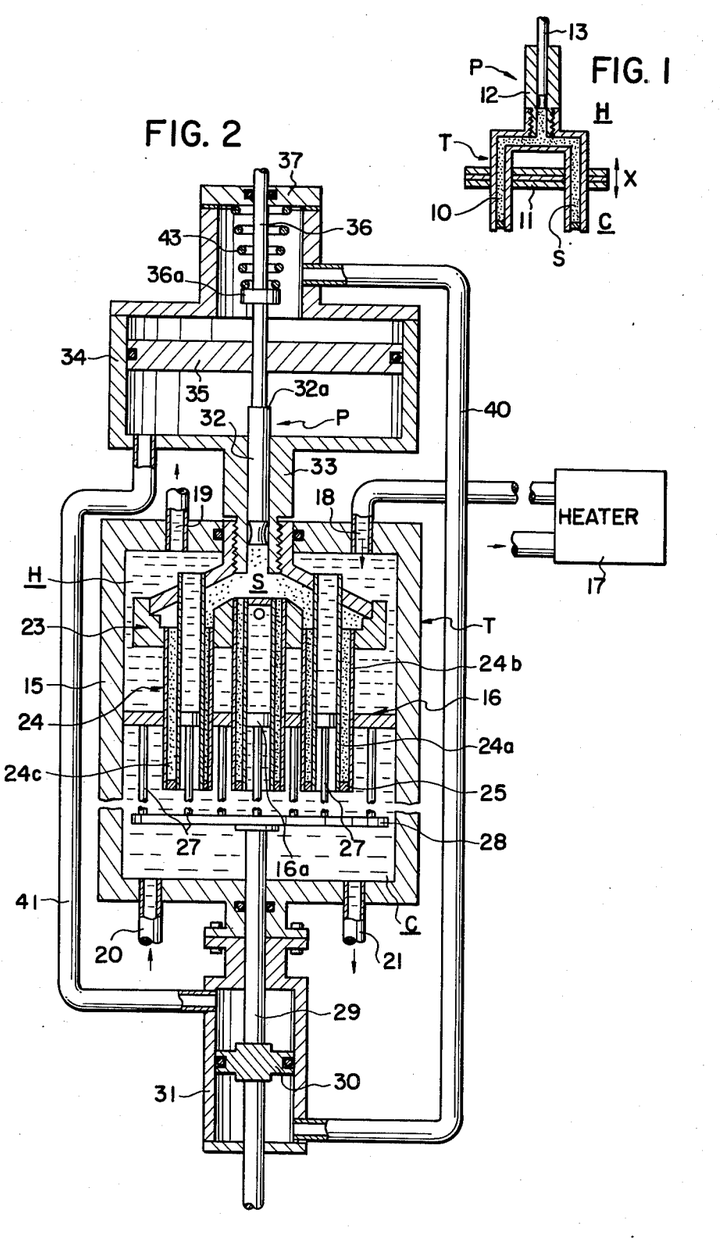
FIG. 1 is a side view, in vertical section, illustrating the basic principle of the heat engine according to this invention.
FIG. 2 is a longitudinal section of a first form of the heat engine incorporating the principle of the invention.

Referring now to FIG. 1 of the drawings, there is illustrated the operating principle of the heat engine according to this invention. The heat engine comprises essentially a thermal operating section T and a power output section P. The thermal operating section T comprises an enclosure 10 containing therein thermal operating substance S, which is a non-compressible material such as a liquid or a solid, as mentioned hereinbefore, and may be polyethylene, for example. A piston 11 is slidable in the direction of arrow X along the enclosure 10 and serves to isolate or separate a high temperature zone H and a low temperature zone C from each other. The power output section P comprises a cylinder 12 fixed to the enclosure 10 and having an interior communicating with the interior of the enclosure 10 and an output piston 13 slidable in the cylinder 12. The high and low temperature zones H and C form the environment surrounding the enclosure 10.

When the isolating piston 11 is moved downward, almost the entire enclosure 10 is brought into the high temperature zone H, and as a result the thermal operating substance S is heated and expanded. As the internal volume of the enclosure 10 is constant, a part, corresponding to the increase in volume, of the substance S thus expanded is caused to move into the cylinder 12, so that the piston 13 is pushed upward.

When the piston 11 is moved upward, almost the entire enclosure 10 is brought into the low temperature zone C, as a result of which the thermal operating substance S is cooled and contracted. Accordingly, the piston 13 loses the support by the upward pushing force, and is returned to its initial position by gravity or by a restoring force afforded by restoring means such as a spring (not shown). The piston 13 will be pushed upward again by moving the isolating piston 11 downward.

FIG. 2 shows a first form of the heat engine according to this invention. Again, the engine comprises a thermal operating section T and a power output section P. The thermal operating section T includes a casing 15 in the form of a cylinder in which an isolating piston 16 is slidable. The piston 16 serves to divide the interior of the casing 15 into a high temperature zone H and a low temperature zone C. The high temperature zone H is filled with a hot fluid medium such as hot water or heated oil. The hot medium is heated in and supplied from a heater 17 and supplied into the high temperature zone H through an inlet 18, the hot medium being discharged through an outlet 19 thereby to maintain a constant high temperature in the high temperature zone. Likewise, a cool or cold fluid medium such as water or oil at ambient temperature is introduced into the low temperature zone C through an inlet 20 and discharged through an outlet 21 thereby to maintain a constant low temperature in the zone C.

Figure 3:
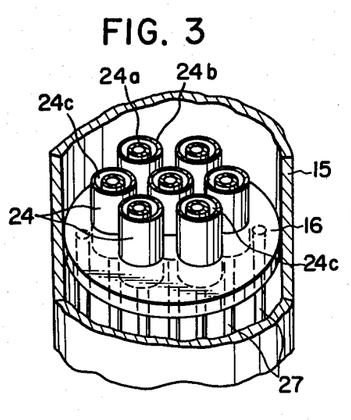
FIG. 3 is a fragmentary perspective view showing a thermal operating section of the engine shown in FIG. 2.

The casing 15 has therein a hollow header 23 fixedly secured to the top wall of the casing. The header 23 supports a number of cylinder units 24 each of which comprises inner and outer cylinders 24a and 24b coaxially and vertically disposed, as also shown in FIG. 3, so as to define an annular space 24c therebetween. The cylinder units 24 are fixedly secured at their upper parts to the header 23 with their annular spaces 24c communicating with the interior of the header 23. The lower ends of the annular spaces 24c are closed by plugs 25, so that the interiors of the annular spaces 24c and the header 23 are in mutual communication. The thermal operating substance S of the previously stated nature fills the mutually communicating interiors of the header 23 and the annular spaces 24c. It will be noted that the header 23 and the cylinder units 24 form the enclosure means for the thermal operating substance. The hollow interiors of the inner cylinders 24a are in communication with the high temperature zone H so that the hot fluid medium can enter them.

The piston 16 is generally in the form of a disc, as clearly illustrated in FIG. 3, with a number of circular holes for sliding engagement with the outer surfaces of the cylinder units 24 and with a number of cylindrical sections 16a each forming a small piston which is slidable in the inner cylinder 24a and disposed coaxially within the associated circular hole. The small pistons 16a and the remaining part of the piston 16 have piston rods 27 extending downward and fixed at their lower ends to a supporting disc 28 which is in turn connected to a piston rod 29 of a piston 30 slidable in a hydraulic cylinder 31.

The power output section P comprises an output piston 32 slidable in a cylinder 33 fixedly secured to the top wall of the casing 15. Connected contiguously to and coaxially with the cylinder 33, there is provided a hydraulic cylinder 34 in which a piston 35 is slidable. A piston rod 36 fixed coaxially to the output piston 32 extends upward slidably through the hydraulic piston 35 and is slidably guided by a top wall 37 of the hydraulic cylinder 34. The piston rod 36 has an enlarged abutting part 36a in the form of a flange disposed above the piston 35. A shoulder 32a is formed between the piston 32 and the rod 36.

The upper side of the piston 35 is communicatively connected to the lower side of the aforementioned hydraulic piston 30 via a hydraulic conduit 40, while the lower side of the piston 35 is communicatively connected to the upper side of the hydraulic piston 30 via another hydraulic conduit 41. A compression spring 43 is interposed between the wall 37 and the flange 36a.

The operation of the above described heat engine starts with the hydraulic piston 30 and therefore the isolating piston 16 at their lowermost positions. In this condition, the high temperature zone H prevails in the casing 15, and the hot fluid medium is introduced into the high temperature zone to heat the thermal operating substance S. Then, the operating substance expands and the output piston 32 is forced to move upward against the force of the spring 43.

When the output piston 32 has moved upward almost to its upper dead point, the shoulder 32a thereof abuts against the lower surface of the hydraulic piston 35 and causes the latter to move upward. As a result, the hydraulic fluid on the upper side of the piston 35 is caused to flow through the conduit 40 to the lower side of the hydraulic piston 30, so that the piston 16 separating the high and low temperature zones H and C is moved upward to expand the lower temperature zone C so that it prevails in the interior of the casing, whereby the thermal operating substance S is cooled and contracted. As a consequence, the output piston 32 is moved downward by the force of the spring 43.

During the descending movement of the output piston 32, its abutting flange 36a abuts against the upper surface of the hydraulic piston 35 and causes the same to move downward, so that the hydraulic fluid at the lower side of the piston 35 is caused to flow toward the upper side of the hydraulic piston 31, and the isolating piston 16 is therefore moved downward to allow the high temperature zone H to expand so as to surround the cylinder units 24. As a result, the thermal operating substance S is again subjected to the high temperature fluid medium in the zone H and is expanded to cause the output piston 32 to carry out its advancing stroke.

In the above described embodiment of the invention, the operating substance S is enclosed in the enclosure means comprising the inner and outer cylinders 24a and 24b, which cooperate to define the annular spaces 24c therebetween. This arrangement is advantageous in that the operating substance S in the annular spaces 24c is heated and cooled through both the inner and outer cylinders. In order to promote the heat transfer between the operating substance S and the high and low temperature fluid medium in the high and low temperature zones, the inner and outer cylinders 24a and 24b may be provided with a number of radially extending fins 44 and 45 on the outer and inner surfaces thereof, respectively, as illustrated in FIG. 4.

Figure 5:
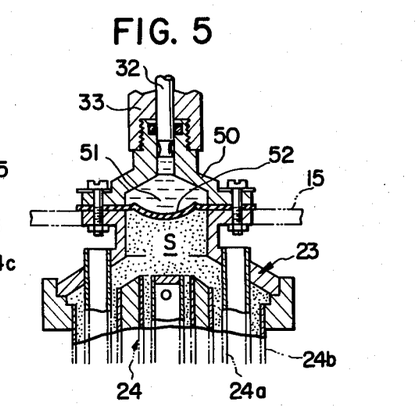
FIG. 5 is a fragmentary longitudinal section showing a modification of the engine of FIG. 2.

A modification of the embodiment of the invention shown in FIG. 2 is illustrated in FIG. 5. In this modification, the expansion and contraction of the thermal operating substances S is not transmitted to the output piston 32 directly but transmitted through a pressure medium. More specifically, a pressure medium chamber 50 is provided between the header 23 and the cylinder 33. The pressure medium chamber 50 contains a pressure medium 51 such as water or oil. A diaphragm 52 is provided so that the pressure medium 51 is not mixed with the thermal operating substance S. It will be noted that in this modified form the output of the engine can be taken out in any desired direction by the provision of the pressure medium chamber.

In this modified form, as the thermal operating substances S is expanded, the diaphragm 52 is moved upward by the same amount as the amount of expansion. As a result, the medium 15 pushes the piston 32 upward. In this connection, it is preferable from the point of view of thermal efficiency that the heat of the thermal operating substance S be blocked by the diaphragm 52 so as not to be transferred to the medium 51. When the thermal operating substance is contracted, the pressure of the medium 51 is reduced with the return of the diaphragm 52, and the output piston 32 also returns to its initial position.

Figures 4, 6:
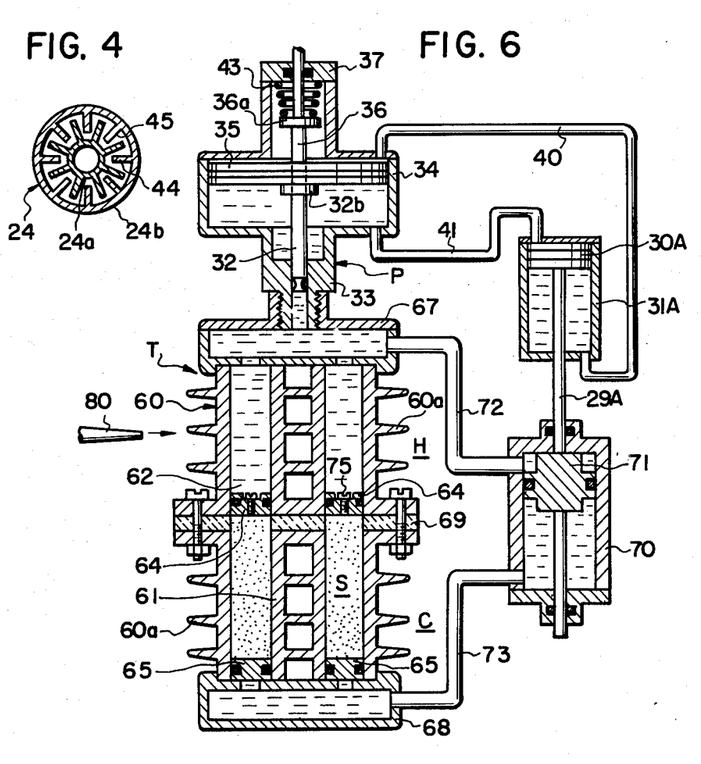
FIG. 4 is a cross section, on an enlarged scale, of a modification of a cylinder unit used in the first form of the heat engine shown in FIGS. 2 and 3.
FIG. 6 is a longitudinal section of a second form of the heat engine according to this invention.

A second form of the heat engine according to the invention is shown in FIG. 6, in which the pressure medium can be moved so that the thermal operating substance reciprocates between the high temperature zone and the low temperature zone.

The heat engine comprises a cylindrical housing 60 having fins 60a therearound for promoting heat transfer to and from the cylindrical housing 60. The housing 60 has a cylindrical inner wall 61, and a plurality of vertically extending cylindrical hollow spaces 62 are formed between the inner and outer walls of the housing. Within each of the spaces 62, there are provided upper and lower sealing pistons 64 and 65 which are slidable relative to the space 62. The thermal operating substance S fills the space between the upper and lower sealing pistons 64 and 65, whereby these are maintained spaced apart vertically from each other.

The housing 60 is divided into upper and lower sections with a heat-insulating material 69 interposed therebetween to prevent heat transfer.

An upper header 67 is fixedly secured to the top of the housing 60 in a manner such that the interior of the header and the spaces 62 in the housing 60 communicate with each other. Similarly, a lower header 68 is fixedly secured to the bottom of the housing 60 in a manner such that the interior of the header and the spaces 12 in the housing are in mutual communication.

A control cylinder 70 has a control piston 71 slidable therein, and the cylinder spaces above and below the piston 71 are connected to the upper and lower headers 67 and 68 via conduits 72 and 73, respectively. The same hydraulic fluid mediums fill the headers, control cylinder and conduits. Each of these mediums functions as a pressure medium for transmitting force due to pressure increase caused by the expansion of the thermal operating substance S to the output piston 32.

The output piston 32 is slidably supported in output cylinder 33 fixedly supported on the upper header 67, which output cylinder 33 is connected to hydraulic cylinder 34 slidably receiving therein piston 35, through which piston rod 36 forming an integral continuation of the output piston 32 passes slidably. The piston rod 36 has an abutting flange 36a as well as another abutting flange 32b at the upper and lower side of the hydraulic piston 35, respectively. Compression spring 43 is interposed between top wall 37 of the cylinder 34 and the flange 36a. A hydraulic cylinder 31A, identical in function with the hydraulic cylinder 31 shown in FIG. 2, receives slidably therein a piston 30A which is coupled to the aforementioned piston 71 through a piston rod 29A. The chambers of the cylinder 31A above and below the piston 30A are in communication with the chambers of the cylinder 34 above and below the piston 35 via conduits 40 and 41, respectively.

The atmosphere surrounding the upper section of the housing 60 constitutes the high temperature zone H, while the atmosphere surrounding the lower section of the housing 60 constitutes the low temperature zone C. In order to form the high temperature zone H, the outer wall of the upper section of the housing 60 is directly heated by flames of combustor nozzles or burners 80 or may be subjected to a combustion gas of high temperature. Alternatively, only the upper section of the housing 16 may be encased by a casing such as the casing 15 shown in FIG. 2, and a high temperature fluid such as heated oil may be supplied into the casing to heat the housing upper section. In contrast, the lower section of the housing 60 may be left as it is or may be cooled by water flowing therearound. In the former case, the surrounding air forms the low temperature zone C and in the latter case, the water constitues the same.

In the above stated embodiment of the invention, the spaces 62 and the sealing pistons 64 and 65 are of circular cross section, but the spaces 62 may be replaced by a single annular space and annular sealing pistons may be slidably fitted in the annular space.

In the condition shown in the figure, the output piston 32 has just finished its advancing or upward stroke, and the thermal operating substance S has just moved to its lowermost position. Since the substance S is now being cooled by the low temperature zone C, it contracts and the pressure of the fluid within the header 67 is decreased whereby the output piston 32 is allowed to descend by the force of the spring 43. When the output piston 32 has moved downward almost to its lowermost position, its abutting flanges 36a abuts on the upper surface of the hydraulic piston 35 and causes the piston 35 to shift downward. As a result, the hydraulic piston 30A is moved downward to cause the control piston 71 to shift downward.

Then, the fluid medium in the lower chamber of the cylinder 70 is moved via the conduit 73 toward the interior of the lower header 68, while the fluid medium in the upper header 67 is moved via the conduit 72 toward the upper chamber of the cylinder 70. As a result, the upper and lower sealing pistons 64 and 65 as well as the thermal operating substance S are shifted upward in the annular space 62 to the region surrounded by the high temperature zone H, whereby the operating substance S is heated and expanded to increase the pressure of the fluid mediums in the upper and lower headers 67 and 68. This increase of the fluid medium pressure causes the output piston 32 to move upward.

It will be understood that the increased pressures of the fluid mediums above and below the piston 71 are of the same value and are in equilibrium. However, in the process of expansion of the operating substance S, the fluid medium in the upper header 67 is allowed to escape into the output cylinder 33 while forcing the output piston 32 upward, whereas the fluid medium in the lower header 68 has no space to escape into, so that, actually, the operating substance S is further shifted upward by some small distance or the piston 71 is slightly moved back upward. Therefore, the amount of shift of the piston 71 at the beginning should be determined in consideration of the above fact.

The distance between the upper and lower sealing pistons 64 and 65 is preferably such that when one of them is in the region of one temperature zone the other sealing piston is in the region of the other temperature zone.

When the output piston 32 is forced upward and has almost reached to the upper dead point, the abutting flange 32b of the piston 32 abuts against and lifts the hydraulic piston 35, so that the hydraulic fluid above the piston 35 flows into the lower chamber of the cylinder 31A to shift the piston 30A, which is in the lowered position, upward. As a result, the piston rod 29A causes the control piston 71 to move upward to its original position, whereby the thermal operating substance S is shifted downward back to the position shown in the figure. Accordingly, the operating substance S is now subjected to influence of the low temperature zone C and is cooled and contracted to allow the output piston 32 to return to its original position by the returning force of the spring 43.

During the descending movement of the output piston 32, the abutting flange 36a abuts against the upper surface of the piston 35 and causes the same to move downward as was already described hereinbefore. Consequently, the operating substance S is again shifted upward to undergo the heating by the high temperature zone H and the advancing stroke of the output piston 32 is carried out. It will be understood that the above stated operation is carried out repetitively.

It is desirable that the sealing piston 64 have at least one adjusting plug 75 for enabling the venting of air in the space between the upper and lower sealing pistons 64 and 65 as well as for enabling the adjustment of the amount of the thermal operating substance S to be charged.

Figure 7:
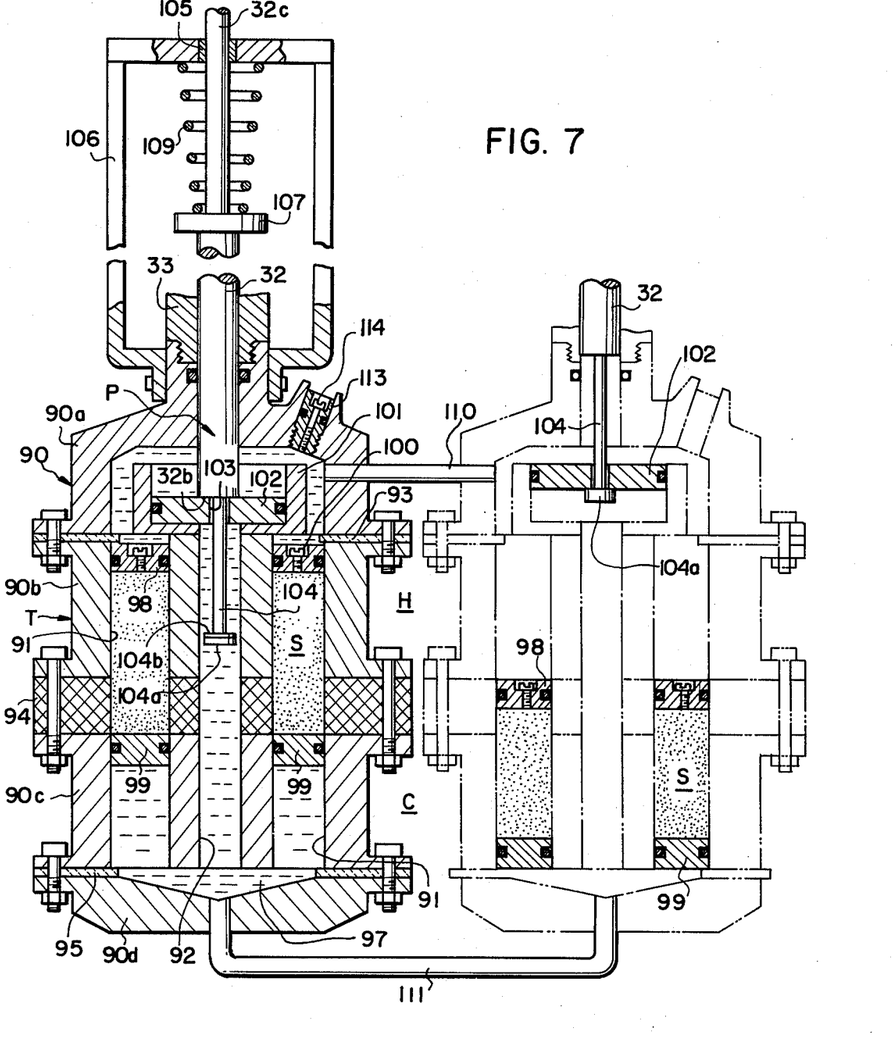
FIG. 7 is a longitudinal section of a third form of the heat engine according to this invention, the figure also showing the possibility of installing the engine in parallel.
Figure 8:
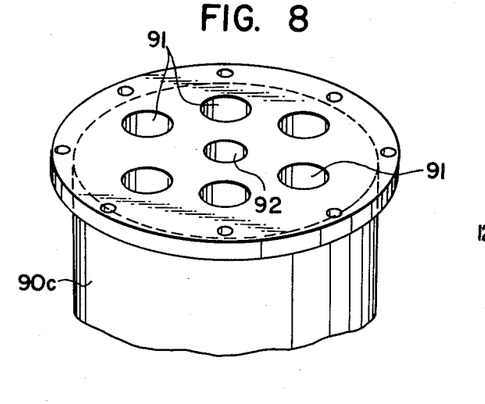
FIG. 8 is a fragmentary perspective view showing a housing section of the engine shown in FIG. 7.

FIGS. 7 and 8 show a third form of the heat engine according to this invention. This form is considered to be the most practical form.

This form of the heat engine also has a cylindrical housing 90 made up of four housing sections 90a, 90b, 90c and 90d. The uppermost first section 90a is in the shape of a cap, while the second and third sections 90b and 90c have the same cross-sectional shape and are formed with annularly arranged peripheral cylindrical holes 91 and a central cylindrical hole 92 as clearly shown in FIG. 8. The first section 90a and the second section 90b are bolted together with a heat insulating material 93 interposed therebetween. The second and third sections 90b and 90c are also bolted together. However, in this case, a relatively thick regenerative heat exchanger 94 is interposed therebetween. The third and fourth sections 90c and 90d are also bolted together with a heat insulating material 95 interposed therebetween.

Similarly as in the engine shown in FIG. 6, the second housing section 90b is surrounded by the high temperature zone H, and the third housing section 90c is surrounded by the low temperature zone C. These high and low temperature zones can be provided in the same way as described in connection with the engine shown in FIG. 6. The fourth or bottom housing section 90d has a recessed space 97 through which the peripheral cylindrical holes 91 and the central cylindrical hole 92 are in mutual communication.

As in the second embodiment of the invention, each of the peripheral holes 91 slidably receives therein upper and lower sealing pistons 98 and 99 together with the thermal operating substance S charged therebetween. Again, each upper sealing piston 98 may be provided with an adjusting plug 100.

In the interior space within the first housing section 90a, there is provided a control cylinder 101 fixed to the upper surface of the second housing section 90b, and a control piston 102 is slidably disposed in the cylinder 101. The piston 102 has a vertical hole 103 through which a rod 104 with an abutting flange 104a extends loosely. The flange 104a is applied with a packing 104b for sealing engagement with the lower surface of the piston 102. The rod 104 is rigidly connected to an output piston 32 of larger diameter so that an abutting shoulder 32b is formed. The output piston 32 is slidable in an output cylinder 33 fixedly secured to the top of the first housing section 90a, and extends upward to terminate in the uppermost portion 32c, which is slidably passed through a bush 105 secured in a supporting frame 106, which is in turn fixedly supported on the first housing section 90a. The output piston 32 has a spring mounting flange 107 on its portion extending upward, and a compression coil spring 109 is interposed between the flange 107 and the frame 106 to urge the output piston 32 downward.

Into the interior of the housing 90 is charged a hydraulic fluid medium, such as oil, which serves as a pressure medium. In FIG. 7, the interior space of the first housing section 90a and the recessed space 97 of the fourth housing section 90d are shown as being connected to conduits 110 and 111, respectively. However, in this form now being described, these conduits should be disregarded for purpose of clarity.

In the state of the heat engine shown in FIG. 7, the masses of the thermal operating substance S together with the upper and lower sealing pistons 98 and 99 have just moved upward in the region of the high temperature zone H and are being heated by the zone. As a consequence, the masses of the operating substance S expand so that the pressure of the fluid medium in the housing 90 is increased, whereby the output piston 32 is pushed upward against the force of the spring 109 because the interior space of the housing 90 is completely closed.

When the output piston 32 has almost reached its upper dead point, the abutting flange 104a of the rod 104 abuts against the lower surface of the piston 102 to cause the latter to move upward relative to the cylinder 101, and, as a result, the pressure medium above the piston 102 causes the masses of the thermal operating substance S together with the sealing pistons 98 and 99 to descend in the holes 91 into the region of the low temperature zone C. Consequently, the masses of the operating substance S are cooled and contracted and the output piston 32 is moved downward, by the force of the spring 109, back to the original position. Near the end of this downward movement, the shoulder 32b abuts against the upper surface of the piston 102 to cause the piston to shift downward, whereby the masses of the thermal operating substance S as well as the upper and lower sealing pistons 98 and 99 are shifted upward in the holes 91 to the positions shown in FIG. 7, and the expansion of the masses of the operating substance S is carried out again to urge the output piston 32 upward in its advancing stroke.

In order to adjust the position of the center of the strokes of the output piston 32, an adjusting plug 113 may be screwed in the wall of the housing. The plug 113 serves to control the quantity and pressure of the pressure medium. If desired, the plug 113 may be connected to a load variation detector (not shown) or to a maximum and minimum stroke detector (also not shown) to enable the control of the position of the center of the strokes. A removable screw 114 in the adjusting plug 113 is for venting air which may be remaining in the housing.

The regenerative heat exchanger 94 is provided for heat economy. When the operating substance S is in the position shown in FIG. 7, it is heated by the high temperature zone H and retains the heat therein. As the substance S is then shifted downward toward the region of the low temperature zone C, it gives off heat to the heat exchanger 94. When the substance S is again shifted to the high temperature zone H, it receives and absorbs the heat which has been accumulated in the heat exchanger.

As indicated by chain lines in FIG. 7, an identical engine may be installed in parallel relation to the above stated engine with some operational phase difference, for example 180°, therebetween. In this case, the aforementioned conduits 110 and 111 may be provided to connect the interior spaces of the first housing sections 90a of the two engines to each other and to connect the recessed spaces 97 of the two engines to each other, for pressure equilibrium between the two engines.

Figure 9:
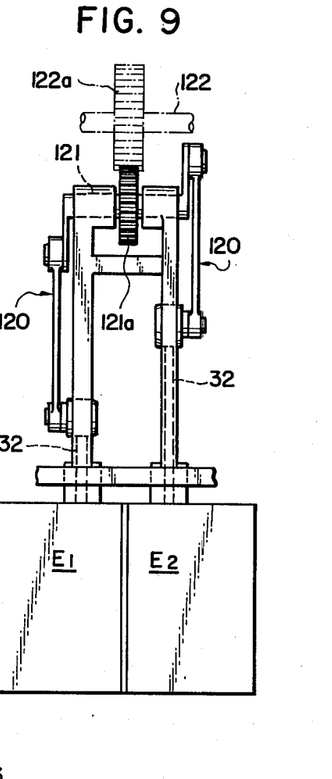
FIG. 9 is a view explanatory of the manner of arranging two heat engines and of converting reciprocating motion into rotary motion.

FIG. 9 shows how a rotary motion can be derived from the reciprocating motion of the output shafts 32 of the two engines E1 and E2 installed in parallel relationship. The two output shafts 32 are respectively coupled to two crank mechanisms 120 of known type which transform the reciprocating motion into rotation of a rotary shaft 121. This shaft 121 has a gear 121a fixed thereto, which is in mesh with a gear 122a of an output rotary shaft 122.

It will be seen from FIG. 9, that there is a difference in operational phase angle between the two engines E1 and E2. When the two engines are combined in this manner, the restoring springs 43 and 109 shown in FIGS. 2, 6 and 7 can be dispensed with because the force to return the output shaft 32 to its lower or inner dead point can be obtained from the advancing stroke of the other engine. It will be understood that more than two engines could be combined in the same manner.

Figure 10:
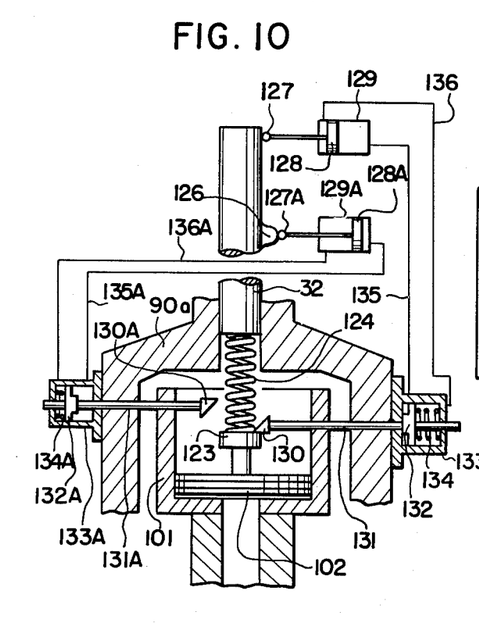
FIG. 10 is a fragmentary section showing a modification of the third form illustrated in FIG. 7.

In FIG. 10, there is shown a modification of the engine illustrated in FIG. 7. In this modification, the output piston 32 is connected to an engagement flange 123 integrally formed with the control piston 102 through a spring 124, and the rod 104 (FIG. 7) is dispensed with. This spring 124 is anchored at its upper and lower ends to the output piston 32 and the engagement flange 123 and operates both in tension and compression. On the upward extension of the output shaft 32 there is formed a cam 126, while cam followers 127 and 127A are provided at positions at which the cam 126 will arrive when the output shaft 32 has moved to its upper and low dead points, respectively. The cam followers 127 and 127A are coupled to pistons 128 and 128A slidably disposed in cylinders 129 and 129A, respectively.

Arresting members 130 and 130A are provided in the control cylinder 101 to engage the upper and lower surfaces of the flange 123 so as to prevent upward and downward movements of the control piston 102, respectively. The arresting members 130 and 130A are fixedly mounted on the free ends of sliding bars 131 and 131A passing through the housing 90 to the outside and rigidly coupled to pistons 132 and 132A slidably disposed in cylinders 133 and 133A, respectively. The pistons 132 and 132A are constantly urged toward the housing by compression springs 134 and 134A in the cylinders 133 and 133A. Hydraulic fluid lines 135 and 136, and 135A and 136A connect the cylinders 129 and 133, and 129A and 133A, as shown.

When the operating substance S is in the upper position shown in FIG. 7 and is heated and expanded, the output piston 32 are forced upward. However, since the arresting member 130 prevents the flange 123 and hence the control piston 102 from moving upward, only the output shaft 32 is allowed to move upward, the spring 124 being tensioned. When the output shaft 32 has almost reached its upper dead point, the cam 126 acts on the cam follower 127 to push it to the right as viewed in the figure, so that the hydraulic fluid on the right-hand side of the piston 128 is caused to flow into the left-hand side chamber of the cylinder 133, thereby to cause the arresting member 130 to move out of engagement with the flange 123. As a consequence, the control piston 102 is rapidly shifted upward by the spring 124, whereby the pressure medium above the piston 102 acts on the sealing pistons 98 to shift the masses of the operating substance S downward into the region of the low temperature zone C. At the extremity of the upward shift of the control piston 102, the lower surface of the flange 123 is engaged by the arresting member 130A after riding over the same.

When the output piston 32 descends toward its lower dead point as a result of contraction of the operating substance S, the flange 123 and hence the control piston 102 are prevented from moving downward by the arresting member 130A, and the spring 124 is compressed. When the output piston 32 has almost reached its lower dead point, the cam 126 depresses the cam follower 127A and the arresting member 130A is retracted to be disengaged from the flange 123, whereby the control piston 102 is allowed to shift downward to raise the operating substance S into the region of the high temperature zone H.

Figure 11:
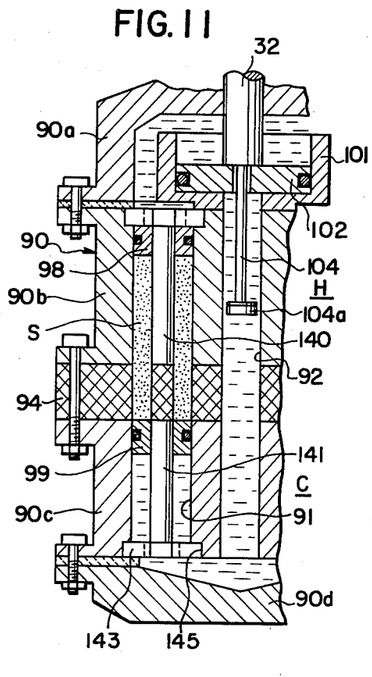
FIG. 11 is a fragmentary view illustrating a further modification of the third form of the heat engine.
Figure 12:
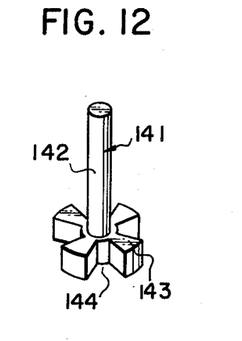
FIG. 12 is a perspective view showing an insert or core used in the engine illustrated in FIG. 11.

A further modification of the engine shown in FIG. 7 is illustrated in FIG. 11. The feature of this modification is that cores or inserts 140 and 141 are provided in the cylindrical holes to improve heat transfer between the high and low temperature zones and the operating substance S. The cores 140 and 141 are made of a metal having high heat conductivity and are of identical construction. A perspective view of the core 141 is shown in FIG. 12 from which it will be seen that the core consists of a rod 142 and a mounting flange 143 with peripheral cutouts 144. As shown in FIG. 11, the flange 143 is fitted in a recess 145 formed in the housing to securely hold the rod 142 within the hole 91. Because of the provision of the cores, heat transfer is effected also inside the operating substance S.

Figure 13:
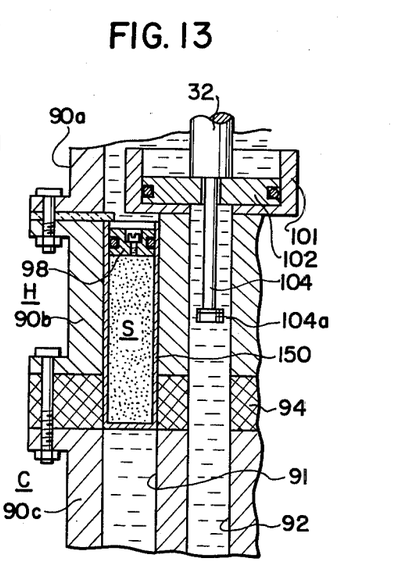
FIG. 13 is a fragmentary view illustrating a still further modification of the third form of the engine.

In a still further modification shown in FIG. 13, the lower sealing piston 99 is dispensed with, and, instead, a cylindrical container 150 with open top and closed bottom is slidably provided in each of the cylindrical holes 91. The thermal operating substance S is charged into the container 150, and the sealing piston 98 is slidably fitted in the container 150. It will be understood that the container 150 is shifted upwardly and downwardly in the hole 91 with the substance S contained therein.

Figure 14:
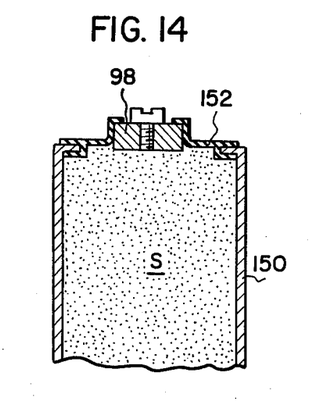
FIG. 14 is a fragmentary section showing a modification of a container and a sealing piston used in the engine of FIG. 13.

In the example of FIG. 14, the sealing piston 98 is attached to the cylindrical container 150 through a diaphragm 152.

Figures 15, 16, 17, 18:
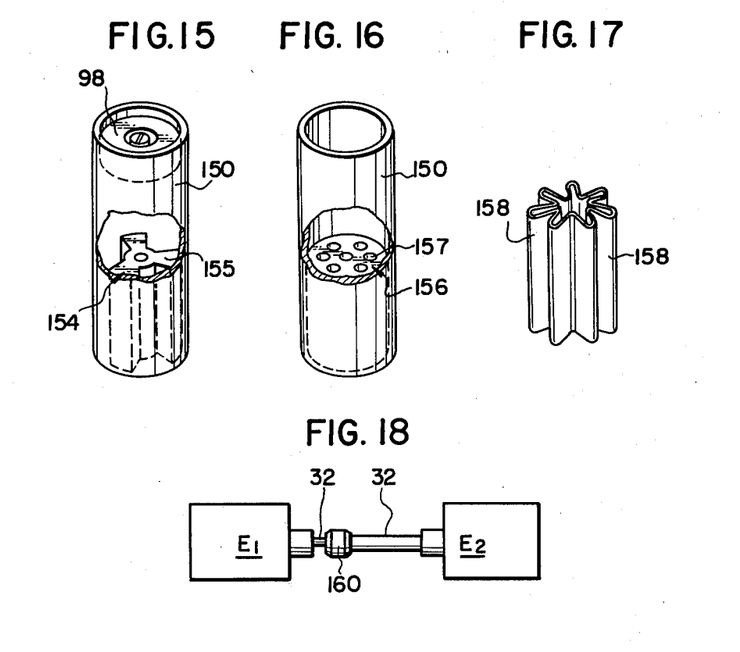
FIG. 15 is a perspective view showing a modified example of the container used in the engine of FIG. 13.
FIG. 16 is a view similar to FIG. 15 but showing another example of the container.
FIG. 17 is a perspective view showing an example of a heat transfer promoting member.
FIG. 18 is a view showing an example of coupling two heat engines in tandem.

FIG. 15 shows a possibility of mounting in the cylindrical container 150 a heat transfer promoting member 154. This member 154 is fixed to the inner wall of the container 150 in heat conducting relation and serves to give and remove heat, inside of the operating substance, to and from the operating substance in the container. The heat transfer promoting member 154 has radially extending fins 155 which contact or are integral with the container 150.

In the example shown in FIG. 16, the heat transfer promoting member 156 is in the form of a solid cylinder formed with a number of vertical holes 157.

FIG. 17 illustrates another possibility of the heat transfer promoting member made of sheet metal and having a number of radially extending ribs 158.

Although the heat transfer promoting members shown in FIGS. 15, 16 and 17 are provided in the container 150, any of them can also be disposed directly in the vertical hole 91 to move up and down in and with the operating substance S. It will be understood that, in this case, the heat transfer promoting member has the same function as the cores or inserts 140 and 141.

Figure 19:
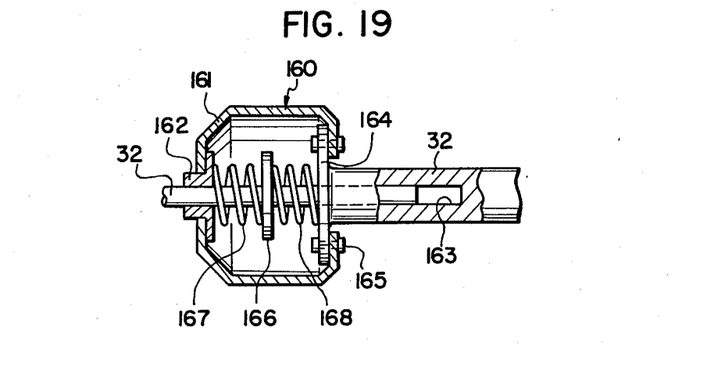
FIG. 19 is a sectional view showing a coupling used in the example of FIG. 18.

FIG. 18 illustrates a combination of a pair of the heat engines E1 and E2 according to this invention in series or in tandem. The output shafts 32 of these engines are disposed in coaxial relation and connected by a coupling device 160, which, as shown in FIG. 19, comprises a case 161 with a bush 162 through which the output shaft 32 of the engine E1 extends slidably into the case 161. The output shaft 32 of the other engine E2 is enlarged in cross section as shown and slidably receives the one output shaft 32 in its bore 163. The enlarged output shaft 32 is fixed to the case 161 by means of a flange 164 and bolts 165 so that the enlarged output shaft 32 turns with the case 161. The small output shaft 32 is formed with a flange 166, and on both sides thereof coil springs 167 and 168 are provided between the bush 162 and the flange 166 and between the flanges 166 and 164. It will thus be seen that the coupling device 160 functions as a cushioning means between the two output shafts 32, and these two shafts are allowed to shift relative to each other during the operation of the two engines, whereby the engines will not be broken even if some difference in displacement of the shafts should occur.

Although this invention has been described hereinbefore with respect to some specific embodiments thereof, it will be apparent to those skilled in the art that these embodiments can be modified without departing from the spirit of the invention. For example, the housing shown in FIG. 6 may be so modified that the cross-sectional dimension thereof is greater in the region surrounded by the high temperature zone than in the region surrounded by the low temperature zone. To this end, the housing may be tapered in the vertical direction. It will be understood that the above modification increases the quantity of heat transferred to the thermal operating substance from the high temperature zone.

Furthermore, if a pressure medium, such as water, which does not mix with the thermal operating substance is used in the engines shown in FIGS. 6 and 7, no sealing pistons will be necessary. The selection of the pressure medium should be made in consideration of its specific gravity, viscosity, surface tension, and so on. If a pressure medium of the above nature is used to dispense with the sealing pistons, the housing of the engine can be made in any appropriate shape in cross section which is effective to improve heat transfer between the high and low temperature zones and the thermal operating substance. For example, the holes in the housing containing the operating substance can be formed internally with a number of ribs and projections for promoting heat transmission.

The embodiments of the invention have been described with respect to continuously operable engines, it is also possible to use this invention as an energy converting and power multiplying device. The basic construction of the converting device will take the form shown in FIG. 1. In this case, the piston 11 is manually or mechanically moved and a multiplied output power is obtained at the output piston 13.

From the foregoing description, it will be understood that the heat engine according to this invention does not need complicated mechanisms and affords a compact and small construction unlike the gas engine. This means that heat input into the engine can be concentrated and heat emission from the engine can be minimized. Another advantage of the heat engine according to this invention is that the efficiency thereof is not influenced by the volumetric scale thereof. Still another advantage of this heat engine is that since it does not carry out explosions as in the internal combustion engines and does not use any suction and delivery valves, substantially no problem of noise occurs. Moreover, since the engine uses a thermal operating substance and a pressure medium such as oil, sealing and lubrication are facilitated.

It is to be noted that the engine according to this invention is a kind of external combustion engine and therefore there is little restriction of the kind of fuel which can be used. This means that fossil fuels, which tend to generate poisonous gases causing air pollution, need not necessarily be used. Furthermore, since the engine according to this invention is of a sealed construction, it is not influenced by adverse environmental conditions such as dust, salt, moisture, and so on.

Possible uses of the heat engine of this invention are as follows.

It can be used at places where production of noise, air pollution and so on should be avoided.

It can be used in the case where a long-term operation is required without maintenance.

It can be used as auxiliary power supplying means in combination with other engines.

It can be used as a power source of land and water vehicles.

It can be used as an energy source for artificial internal organs of human body.

It can be used to derive energy from waste treating plants and so on.

I claim:

1. A heat engine comprising: pressure-tightly closed stationary enclosure means filled with a medium comprising a non-compressible thermal operating substance which changes in volume in accordance with temperature change; means forming a low temperature zone; means forming a high temperature zone greater in temperature than said low temperature zone; displacer means for subjecting said thermal operating substance in said enclosure means alternately to said high and low temperature zones to produce alternate volumetric expansion and contraction of the thermal operating substance; and power output means for converting said volumetric expansion and contraction into a mechanical displacement, said power output means including an output member slidably disposed in a portion of said enclosure means, said output member closing the enclosure means but being movable relative to the same in accordance with the expansion and contraction of said substance, said enclosure means including a part thereof surrounded by said high temperature zone and another part thereof surrounded by said low temperature zone, said displacer means comprising means for moving the thermal operating substance within the enclosure means between said two parts thereof, said enclosure means including closed hydraulic circulative passage means passing through said two parts thereof, said displacer means being disposed in said passage means for displacing said medium in and along the passage means.

2. The heat engine as claimed in claim 1 wherein said displacer means comprises a piston.

3. The heat engine as claimed in claim 1 wherein said enclosure means comprises a housing within which said circulative passage means is enclosed so that said displacer means is within the housing.

4. The heat engine as claimed in claim 1 wherein said enclosure means comprises a housing, encasing means provided outside of the housing to encase said displacer means, and conduits connecting the housing and said encasing means so as to form said circulative passage means.

5. The heat engine as claimed in claim 1, further comprising spaced apart sealing piston means confining therebetween said thermal operating substance and disposed within said circulative passage means so as to be movable therewithin, said passage means containing therein a hydraulic fluid occupying the interior space thereof other than the space occupied by said sealing piston means and said thermal operating substance, said hydraulic fluid and said thermal operating substance constituting said medium.

6. The heat engine as claimed in claim 5 wherein said circulative passage means is so constructed that the hydraulic fluid contained therein is interposed between one of the sealing piston means and said output member whereby the hydraulic fluid serves as a pressure medium for transmitting said expansion and contraction of the thermal operating substance to said output member.

7. The heat engine as claimed in claim 1 wherein said enclosure means includes heat insulating means interposed between the two parts of the enclosure means.

8. The heat engine as claimed in claim 1 wherein said enclosure means includes a regenerative heat exchanger forming a part thereof and interposed between the two parts of the enclosure means.

9. The heat engine as claimed in claim 1, further comprising insert means projecting from the enclosure means into the thermal operating substance for promoting heat transfer between the high and low temperature zones and the thermal operating substance via the enclosure means.

10. The heat engine as claimed in claim 1, further comprising a cylindrical container filled therein with the thermal operating substance and having an open end, said container being disposed in said enclosure means so as to be movable therein, and a sealing piston movably closing said open end of the container to confine the thermal operating substance therein, said enclosure means containing a hydraulic fluid occupying the interior space thereof other than the space occupied by said container and said sealing piston.

11. The heat engine as claimed in claim 10 wherein said container comprises a heat transfer promoting means therein.

12. The heat engine as claimed in claim 1 further comprising means for operating said displacer means for subjecting the thermal operating substance to said high and low temperature zones in response to the mechanical displacement of said output member.

13. The heat engine as claimed in claim 1 further comprising energy storing means for storing energy therein in response to the mechanical displacement of said output member and for releasing the energy when the output member is to be returned to its position ready for the next mechanical displacement.

14. The heat engine as claimed in claim 1, wherein said output member is movable between two end portions, said heat engine further comprising energy storing means for storing energy therein during the mechanical displacement of said output member and for releasing the energy near the two end positions of the output member to operate said displacer means for subjecting the thermal operating substance to high and low temperature zones.

15. The heat engine as claimed in claim 1 wherein said thermal operating substance is a synthetic resin.

16. The heat engine as claimed in claim 1 wherein said thermal operating substance is a material containing a paraffin.

* * * * *